United States Patent [19]

Wiederkehr

[11] 4,439,075
[45] Mar. 27, 1984

[54] TOOLHOLDER FOR ROTARY TOOL

[76] Inventor: Hans Wiederkehr, Ifangstrasse 107, Rümlang, Switzerland

[21] Appl. No.: 216,314

[22] Filed: Dec. 9, 1980

[30] Foreign Application Priority Data

Dec. 10, 1979 [CH] Switzerland ............ 10930/79

[51] Int. Cl.³ ........................................ B23B 31/36
[52] U.S. Cl. ............................. 408/239 R; 279/16; 408/139; 408/141
[58] Field of Search ............... 408/127, 139–141, 408/1, 111, 81, 239 A, 239 R; 279/16, 19.2, 19.3, 1 L, 1 DA; 464/139; 403/127, 131, 355, 356

[56] References Cited

U.S. PATENT DOCUMENTS

| 1,377,663 | 5/1921 | Brown et al. | 279/16 |
| 1,398,679 | 11/1921 | Clark | 279/16 |
| 1,862,220 | 6/1932 | Johnson | 464/139 X |
| 2,617,278 | 11/1952 | Sindelar | 408/127 X |
| 2,826,053 | 3/1958 | Munn | 279/16 |
| 3,359,008 | 12/1967 | Stimmerman | 408/127 X |
| 3,491,625 | 1/1970 | Schultze | 408/127 |
| 4,029,429 | 6/1977 | Johnson | 408/139 X |

FOREIGN PATENT DOCUMENTS

| 480846 | of 1938 | United Kingdom | 408/141 |
| 553515 | of 1943 | United Kingdom | 408/141 |
| 667001 | of 1952 | United Kingdom | 408/141 |
| 942071 | of 1963 | United Kingdom | 408/141 |

Primary Examiner—William R. Briggs
Assistant Examiner—Lawrence Meier
Attorney, Agent, or Firm—Roylance, Abrams, Berdo & Goodman

[57] ABSTRACT

A toolholder for a rotary tool has a driving part adapted to be coupled to a machine spindle and a driven part in which a cutting tool may be mounted along a tool axis. The driving part and the driven part are coupled to permit pivotal movement and lateral movement perpendicular to the tool axis by a joint mechanism. This joint mechanism includes a substantially spherically shaped recess in which a substantially spherically shaped body is mounted for pivotal movement to all sides.

6 Claims, 4 Drawing Figures

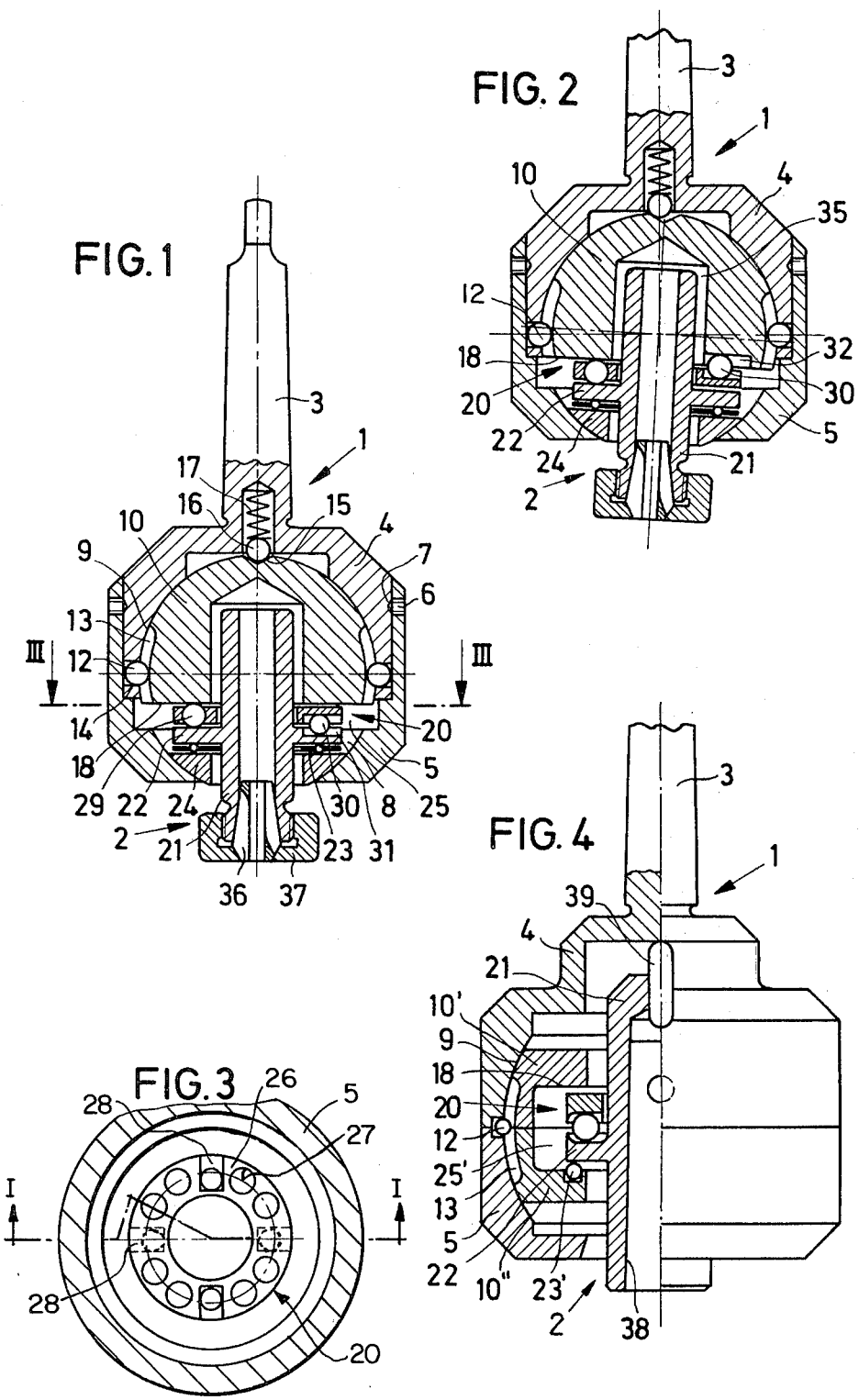

TOOLHOLDER FOR ROTARY TOOL

This invention relates to a toolholder for a rotary tool having a driving part and a driven part which are coupled so that the driving part and the driven part may pivot and move laterally relative to one another.

BACKGROUND OF THE INVENTION

In certain cutting operations performed by rotary cutting tools, for example, the finishing of a rough-bored hole, the drilling of a hole with a drill-jig bushing to guide the cutting tool or the formation of a thread in a rough-bored hole, special toolholders are required for attaching the cutting tools to machine spindles for rotating the tools. Known and conventional toolholders for such cutting operations have a joint-type coupling between the driving and driven parts thereof to permit angular adjustment of the position of the cutting tool relative to the spindle. These conventional joint coupling toolholders permit the axis of the driven part to be inclined relative to the axis of the driving part. The relative angular adjustment of the axes of the driven and driving parts are intended to allow the driven part to adapt itself to the drilling axis defined by the rough-bored hole or the drill-jig bushing.

Various constructions have been used for toolholders to permit this angular adjustment. However, these conventional devices have not been capable of accurately matching the particular hole being cut despite the pivotal or angular adjustment provided by the joint coupling of the toolholder and despite the capability of changing the pivotal axis of the joint coupling relative to the hole being cut. Adjustment of the pivoting axis relative to the hole generally makes the angle of the driven part relative to the driving part smaller. If the cutting tool is not accurately positioned to match the particular hole being cut, the hole axis is modified or there is a jamming of the cutting tool in the hole or drill-jig bushing. Both instances result in undesirable effects, such as increased wear on the tooling and remachining of the tool. Although this problem associated with conventional machinery may be reduced to some extent by making the machine spindle which drives the toolholder also pivotable, such modification of the machine spindle significantly increases the costs and complexity of the machine spindle.

BRIEF DESCRIPTION OF THE INVENTION

It is an object of this invention to provide a toolholder for a rotary tool which will simply and accurately position the tool relative to the hole to be cut.

Another object of the present invention is to provide a toolholder for a rotary tool which is relatively easy and inexpensive to manufacture, and can be accurately positioned relative to a rough-bored hole or drill-jig bushing without jamming.

Other objects, advantages and salient features of the present invention will become apparent from the following detailed desciption of two preferred embodiments of the present invention.

Briefly described, the invention includes a toolholder for a rotary tool. The toolholder comprises a driving part, and a driven part coupled by a joint mechanism. The driving part has a casing coupled to it. The driven part has a mounting mechanism for coupling a tool along a tool axis. The joint mechanism is mounted in the casing and couples the driving and driven parts for relative pivotal movement and lateral movement perpendicular to the tool axis. The joint mechanism includes a substantially spherically shaped recess and a substantially spherically shaped body mounted in the recess for pivotal movement to all sides.

BRIEF DESCRIPTION OF THE DRAWINGS

In order that the manner in which the foregoing and other objects are attained in accordance with the invention ccan be understood in detail, particularly advantageous embodiments thereof will be described with reference to the accompanying drawings, which form a part of the specification, and wherein:

FIG. 1 is a side elevational view of a toolholder for a rotary tool in accordance with one embodiment of the present invention in partial section taken along line I—I of FIG. 3;

FIG. 2 is a partial, side elevational view of the toolholder of FIG. 1 in partial cross section generally perpendicular to that of FIG. 1;

FIG. 3 is a plan view of the toolholder in cross section taken along line III—III of FIG. 1; and FIG. 4 is a partial, partially sectioned side elevational view of a toolholder for a rotary tool in accordance with another embodiment of the present invention.

DETAILED DESCRIPTION OF THE PREFERRED EMBODIMENTS OF THE INVENTION

Referring to FIGS. 1 and 2, the toolholder of the present invention comprises a driving part 1 and a driven part 2. Driving part 1 has a driving taper 3 forming its upper portion which is adapted to be coupled to a machine spindle of a rotary tool. The lower portion of driving part 1 comprises a casing part 4 and a casing cover 5. Casing part 4 is connected to casing cover 5 in any suitable manner, e.g., by countersunk screws 6 which are threaded into casing cover 5 and project into small cavities 7 in casing part 4, to form a clutch casing connected to driving taper 3.

The internal surfaces of casing part 4 and casing cover 5 define a substantially spherically shaped recess 8 with a substantially spherically shaped contact area 9. A substantially spherically shaped or ball shaped body 10 is mounted in recess 9 so as to be free from play relative to contact area 9, while permitting relative pivoting movement of body 10 to all sides and directions relative to casing part 4.

Body 10 is coupled to casing part 4 for simultaneous rotation therewith to enable body 10 to be driven by casing part 4. The torque transmitting coupling between body 10 and casing part 4 comprises balls 12 which are mounted in holes 14 of casing part 4. Balls 12 project from their mounting and casing part 4 into peripheral slots 13 formed in body 10. Preferably, four balls 12 are equally spaced about the periphery of body 10, although any desired number of balls 12 may be provided. The more balls 12 employed to couple body 10 and casing part 4, the smaller the non-uniformity of rotation of body 10 is relative to casing part 4. Elongated peripheral slots 13 and balls 12 mounted in holes 14 of casing part 4 fix body 10 relative to driving part 1 against relative rotation about the longitudinal axis of driving part 1, while permitting relative pivoting movement to all sides and directions about axes perpendicular to the longitudinal axis of driving part 1.

The upper surface of body 10 is formed with a generally hemispherically shaped cavity 15. A locking ball 16 is movably mounted in a vertically extending bore in driving taper 3 opposite cavity 15 and is biased by a spring 17 into engagement with cavity 15. The engagement of cavity 15 with locking ball 16 releasably locks body 10 relative to recess 8 in a position in which body 10 is vertically aligned with driving part 1.

Body 10 has a planar bearing surface or bearing plane 18 on its lower surface. When locking ball 16 is fully received in cavity 15, bearing plane 18 is oriented precisely perpendicular to the axis of driving part 1, as illustrated in FIG. 1. As illustrated in FIG. 2, when body 10 is pivoted in recess 8 with respect to driving part 1, bearing plane 18 is inclined at an acute angle relative to the axis of driving part 1 and locking ball 16 is dislodged, against the bias of spring 17, from cavity 15.

A cylindrical, axially extending space 35 is provided in body 10 which opens on bearing plate 18. A spherical segment 24 is supported on the lower portion of spherical contact area 9 in casing cover 5. Body 10 and spherical segment 24 form a ball or sphere having a gap 25 therein.

The upper portion of driven part 2 comprises a cylindrical sleeve body 21 which is hollow for receiving and mounting a cutting tool therein. The lower portion of driven part 2 comprises a collar 36 which is loosened or tightened by an internally threaded sleeve nut 37 for removal, insertion and fixing of a cutting tool within driven part 2. A bearing flange 22 is unitarily formed with and extends outwardly from the lateral surface of sleeve body 21 perpendicularly to the longitudinal axis of driven part 2.

Cylindrical sleeve body 21 of driven part 2 is located within space 35 in body 10 and extends through an aligned opening in spherical segment 24. Bearing flange 22 of driven part 2 is located within gap 25 with an annular roller bearing 20 and an annular roller bearing 23. Roller bearing 23 is positioned between bearing flange 22 and spherical segment 24 and is located about cylindrical sleeve 21. Roller bearing 20 supports driven part 2 on bearing plane 18 of body 10. Lateral movement is permitted between body 10 and driven part 2 since the lateral dimensions of space 35 and of gap 25 in body 10 are greater than the corresponding lateral dimensions of driven part 2.

Roller bearing 20 as illustrated in FIG. 3, comprises a generally annular bearing ring 26 having a plurality of axial bores 27 extending entirely through the thickness of ring 26 and a plurality of radially extending grooves 28 on each of its sides. Bores 27 house a first plurality of balls 29 which directly transfer axial forces between body 10 and driven part 2 by bearing directly on bearing plane 18 and the upper surface of bearing flange 22.

Two pairs of grooves 28 are provided in ring 26. Each of these grooves extends radially in ring 26 and has a depth less than the thickness of bearing flange 22. The pair of grooves 28 on the upper surface of ring 26 are diametrically opposed. The pair of grooves 28 located on the lower surface of ring 26 (illustrated in phantom lines in FIG. 3) are diametrically opposite each other and are angularly displaced 90° relative to the pair of grooves 28 on the upper surface of bearing ring 26. A second plurality of balls 30 are received in grooves 28 for transmitting torque between body 10 and driven part 2.

As illustrated in FIG. 1, bearing flange 22 has radially extending grooves 31 formed on its upper surface facing bearing ring 20, which grooves are aligned with grooves 28 formed in the lower surface of bearing ring 26 and receive the lower portions of second balls 30 located in grooves 28 in the lower surface of ring 26. In a similar manner, as illustrated in FIG. 2, radially extending grooves 32 are formed in bearing plane 18 which are aligned with grooves 28 formed in the upper surface of bearing ring 26 and receive the upper portions of second balls 30 in grooves 28 in the upper surface of bearing ring 26.

In this manner, roller bearing 20 transfers both axial forces and torque between body 10 and driven part 2, while permitting lateral movement therebetween in a direction transverse to the longitudinal axis of sleeve body 21. A cutting tool which is fixed in sleeve body 21 can be laterally displaced perpendicular to its longitudinal axis due to the construction of bearing ring 20 and the provision of appropriate spacing between body 10 and driven part 2. The cutting tool may be angularly adjusted relative to the longitudinal axis of driving part 1 as a result of the pivotal connection of body 10 to casing 4, 5. By making the toolholder of the present invention capable of both pivoting movement and lateral movement perpendicular to the tool axis, holes or bores may be formed by the tool which are not aligned with the axis of driving part 1 either as a result of angular or lateral displacement.

During rotation of the embodiment of the toolholder, as illustrated in FIGS. 1–3, torque is transmitted from driving taper 3, through casing part 4 and balls 12 and into body 10 through peripheral slots 13. From body 10, the torque is transmitted to the upper pair of second balls 30 through grooves 32, and into bearing ring 26 through grooves 28 in the upper surface of ring 26. From ring 26, the torque passes into lower second balls 30 through lower grooves 28 and into driven part 2 through grooves 31 and bearing flange 22.

An alternative embodiment of the present invention is illustrated in FIG. 4. Features of the toolholder of FIG. 4 which are similar to those of the embodiment of FIGS. 1–3 are indicated with like reference numerals. Casing part 4 and casing cover 5 of this embodiment are coupled in a suitable manner, e.g., by bolts.

In the FIG. 4 embodiment, the generally spherical body comprises two parts 10' and 10". These parts are fixed together in a suitable manner, e.g., by bolts, and define an internal recess 25' therebetween. This recess corresponds to gap 25 of the embodiment of FIGS. 1–3 and houses bearing flange 22 and roller bearing 20. The construction of roller bearing 20 is the same as that illustrated in FIGS. 1–3. However, roller bearing 23 has been replaced by a plurality of balls 23' supported in the lower body part 10". Balls 23' support driven part 2 by bearing against a lower surface of bearing flange 22.

A cutting tool is coupled to driven part 2 in the FIG. 4 embodiment within a driving taper 38. A slot 39 is formed in casing part 4 to facilitate the release of the cutting tool by use of a mandrel which may be inserted into slot 39.

An essential feature of the toolholders of both embodiments of the present invention is that the driven part may be both angularly adjusted to all sides relative to the rotational axis of the spindle and driving part 3 and slideably adjusted in lateral directions perpendicular to the tool axis. The pivotal adjustment is provided by the ball and socket connection between body 10 and casing 4, 5. The lateral movement or adjustment is permitted by the spacing between driven part 2 and the openings within body 10 in which driven part 10 is mounted and by the construction of bearing 20. Thus, recess 8 in casing 4, 5, body 10, and bearing 20 provide a joint arrangement for coupling driving part 1 and driven part 2 for relative pivotal movement and lateral movement perpendicular to the tool axis. This joint arrangement provides the necessary adjustment with a single ball and socket type joint to simplify the toolholder.

The spring biased locking ball 16 illustrated in FIGS. 1 and 2 can be replaced by a catch which can be threaded to secure body 10 relative to casing 4 and driving part 3. Such catch would retain body part 10 in angular alignment with driving part 1 (by eliminating the pivoting movement), while permitting lateral adjustment of driven part 2 relative to driving part 1.

While certain advantageous embodiments have been chosen to illustrate the invention, it will be understood by those skilled in the art that various changes and modifications can be made therein without departing from the scope of the invention as defined in the appended claims.

What is claimed is:

1. A toolholder for rotary tool, comprising
a driving part having a casing coupled thereto;
a driven part having a bearing flange and mounting means for coupling a tool to said driven part along a tool axis; and
joint means, mounted in said casing, for coupling said driving part and said driven part for relative pivotal movement and lateral movement perpendicular to said tool axis, said joint means including:
means in said casing defining a substantially spherically shaped recess,
a substantially spherically shaped body mounted in said recess for pivotal movement to all sides,
means for coupling said recess to said body to transmit torque from said driving part and casing to said body;
a planar bearing surface on said body generally parallel with said bearing flange;
a bearing ring carrying a plurality of bearing balls and coupling balls; and
means in said bearing surface and in said bearing flange for engaging said coupling balls for transmitting torque from said body to said driven part,
said bearing balls concurrently permitting relative lateral movement between said bearing surface and bearing flange.

2. A toolholder for a rotary tool, comprising
a driven part having a casing coupled thereto;
a driven part having a bearing flange and mounting means for coupling a tool in said driven part along a tool axis; and
joint means, mounted in said casing, for coupling said driving part and said driven part for relative pivotal movement and lateral movement perpendicular to said tool axis, said joint means including:
a substantially spherically shaped recess,
a substantially spherically shaped body mounted in said recess for pivotal movement to all sides,
a bearing plane on said body and a roller bearing supporting said driven part on said bearing plane;
and wherein said roller bearing comprises a bearing ring with axial bores and radial grooves on each side thereof said bores receiving first balls directly transferring axial forces between said body and said driven part, said radial grooves receiving second balls transmitting torque between said body and said driven part; and
said bearing flange and said body have radial grooves aligned with said radial grooves on the sides of said bearing ring facing said bearing flange and said body, respectively, and receiving respective second balls.

3. A toolholder according to claim 1, wherein said body and said casing are coupled for simultaneous rotation by balls mounted in said casing and received in peripheral slots in said body.

4. A toolholder according to claim 1, wherein said joint means further comprises means for locking said body relative to said recess in a predetermined position.

5. A toolholder for a rotary tool, comprising
a driving part having a casing coupled thereto;
a driven part having mounting means for coupling a tool therein along a tool axis; and
joint means, mounted in said casing, for coupling said driving part and said driven part for relative pivotal movement and lateral movement perpendicular to said tool axis, said joint means including:
a substantially spherically shaped recess,
a substantially spherically shaped body mounted in said recess for pivotal movement to all sides; and
a space in said body receiving said driven part and having lateral dimensions greater than corresponding lateral dimensions of said driven part to permit said lateral movement.

6. A toolholder according to claim 5, wherein said joint means further comprises bearing means, coupling said body and said driven part, for permitting said lateral movement and transmitting torque therebetween.

* * * * *